United States Patent [19]

Hutchison

[11] 4,015,329
[45] Apr. 5, 1977

[54] TERMINATION OF ELECTRIC CABLES
[76] Inventor: John Blundell Hutchison, "Europa", Liverpool Road, Formby, Merseyside, England
[22] Filed: Dec. 16, 1975
[21] Appl. No.: 641,343
[30] Foreign Application Priority Data
   Dec. 20, 1974   United Kingdom ............ 55233/74
[52] U.S. Cl. .............................. 29/628; 174/65 SS; 174/76
[51] Int. Cl.² .................. H02G 3/06; H02G 15/04; H02G 1/14
[58] Field of Search ............... 174/65 SS, 76, 77 R, 174/78, 89; 29/628, 630 A, 461, 527.1
[56] References Cited
   UNITED STATES PATENTS
   2,827,509   3/1958   Wayman .................... 174/65 SS X FOREIGN PATENTS OR APPLICATIONS
872,376   7/1961   United Kingdom ................ 174/89

Primary Examiner—Laramie E. Askin
Attorney, Agent, or Firm—Buell, Blenko & Ziesenheim

[57] ABSTRACT

An electric line (i.e. a cable or a conduit containing at least one insulated conductor) is terminated by a terminator including first and second members that telescope together. These members have recesses in their adjacent faces and a hardenable insulating compound is inserted between them. They are drawn together before the compound hardens to generate pressure therein and so assist in forming an adequate (e.g. flameproof) barrier.

18 Claims, 10 Drawing Figures

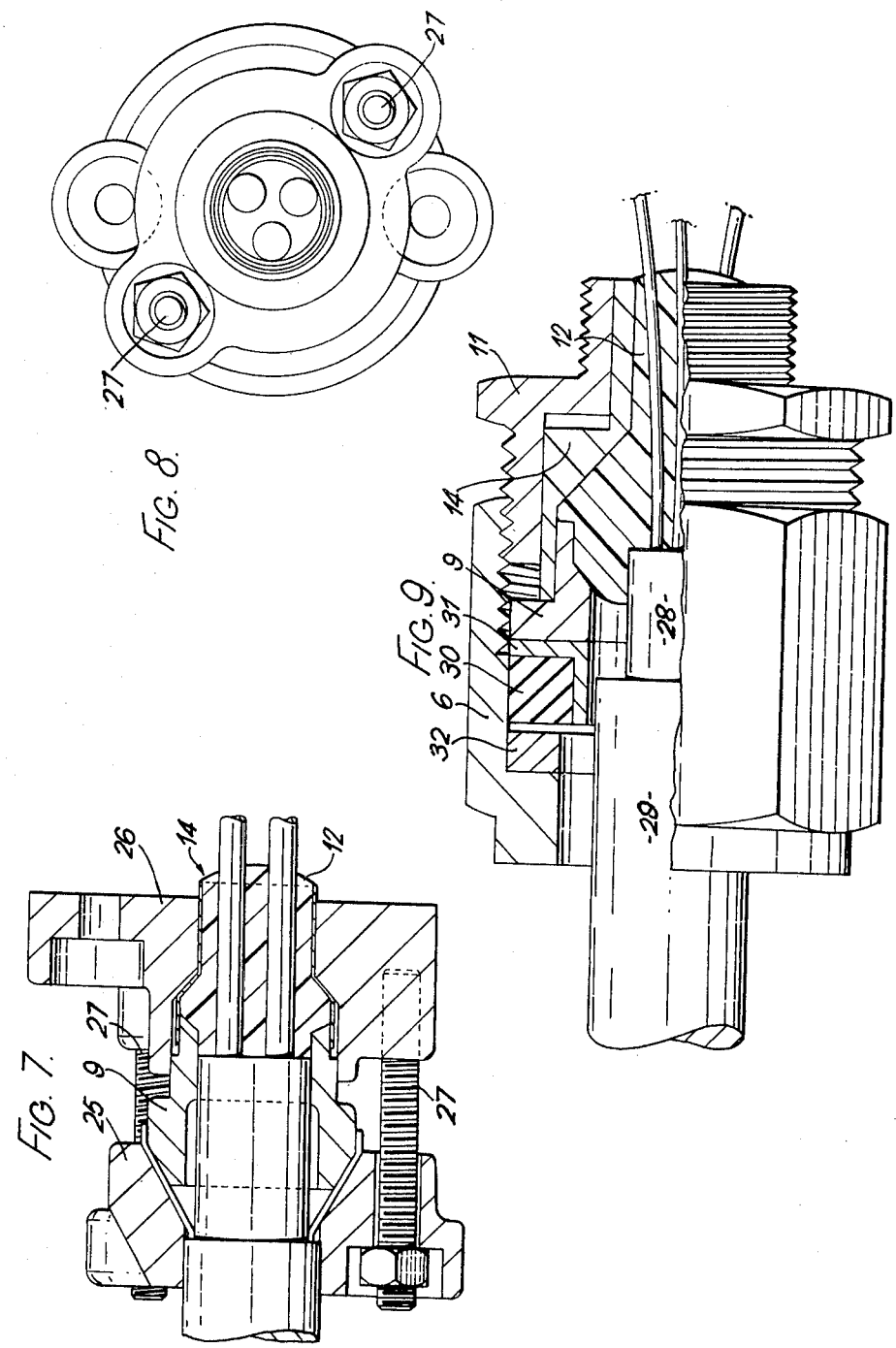

TERMINATION OF ELECTRIC CABLES

This invention relates to the termination of electric cables and conduits containing electric conductors and to glands for this purpose; more especially (but not exclusively) it is concerned with the termination of cables of a kind that cannot be adequately sealed (for particular purposes) by the use of 'mechanical' cable glands of the kind to which British Standard 6121 relates. Currently it is the practice in such circumstances to terminate the cable into a compound chamber that is separate from but attached to the electrical apparatus to which the cable conductors are connected. This arrangement occupies significantly greater space than a gland-type termination and has the disadvantage that in most cases the cable cannot be disconnected from the apparatus without breaking the seal.

In accordance with one aspect of the invention, an electric cable or conduit is terminated as follows:
1. the cable or conduit end is prepared with the individual conductors projecting forwardly from an end of a surrounding protective layer of the cable or from the conduit end as the case may be;
2. the cable or conduit is secured in a first gland member having a recess in its forwardly-directed face around a passage through which the cable passes with the end of the protective layer or conduit in the recess;
3. a quantity of a hardenable insulating compound is applied, in a pasty or viscous condition, so as to fill and stand proud of the recess in the first gland member and to adhere to the parts of the cable or conduit and conductors within it;
4. a second gland member, having a recess in its rearwardly-directed face, is assembled with the first gland member so as to enclose the insulating compound to an extent sufficient to allow generation of pressure in the compound;
5. the first and second gland members are drawn together before the insulating compound has hardened so as to press the compound into firm contact with the cable, and
6. the termination is secured by mechanically engaging at least one of the gland members.

The invention also includes a gland for a cable or conduit comprising a first gland member having a recess in a front face thereof around a passage for the cable or conduit; means for securing cable or conduit to the first gland member; a second gland member having a recess in its rear face telescopically engageable at its rear end with the first gland member; and means for drawing the first and second gland members towards one another.

When the method of the invention is used to terminate a wire-armoured cable, the cable end is preferably secured in the gland by securing the armour wires to the first gland member.

The first and second gland members may be drawn together in various ways. Thus they may be directly engaged by a screw thread to enable them to be drawn together without the intervention of separate members. Another possibility is for them to be drawn together by an additional gland member in screw-threaded engagement with one of them and bearing on the other. In a further form of the invention two additional gland members are used in drawing the first and second gland members together, one bearing on each of them and the two additional members being drawn together by a direct screw-threaded engagement between them or by drawbolts or the equivalent, the latter arrangement resembling conventional practice on the European mainland. When two further gland members directly screwed together are used, they will normally form a gland barrel (engaging the first gland member) and a gland body, (engaging the second gland member).

To assist in generating pressure in the pasty or viscous compound, the recess in the first gland member preferably has a frustoconical base; and for the same purpose the second gland member preferably comprises two parallel end portions joined by a frustoconical tapered portion.

The cable or conduit may be secured to the first gland member by a standard gland (i.e. a gland that is not flameproof) and the invention includes an adaptor for mounting on such a gland to form a gland of the kind defined above.

Preferably the second gland member projects forwardly of any other gland member so that its presence can be confirmed by visual inspection, and similarly the quantity of insulating compound used is preferably sufficient to protrude at the front end of the second gland member.

The invention may be used in terminating mineral insulated cables, and in the case of such cables with an oversheath of lead, a composite seal in accordance with British Patent specification 1,346,297 is preferably used.

Other preferred features of the invention will be apparent from the drawings and the description thereof which follows.

The invention will be further illustrated, by way of example, with reference to the accompanying drawings in which.

Figure 5:
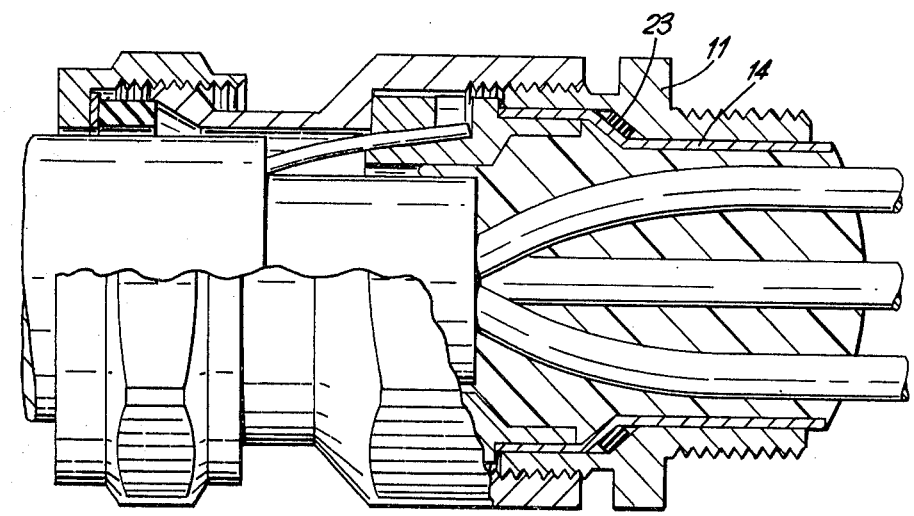
Figure 6:
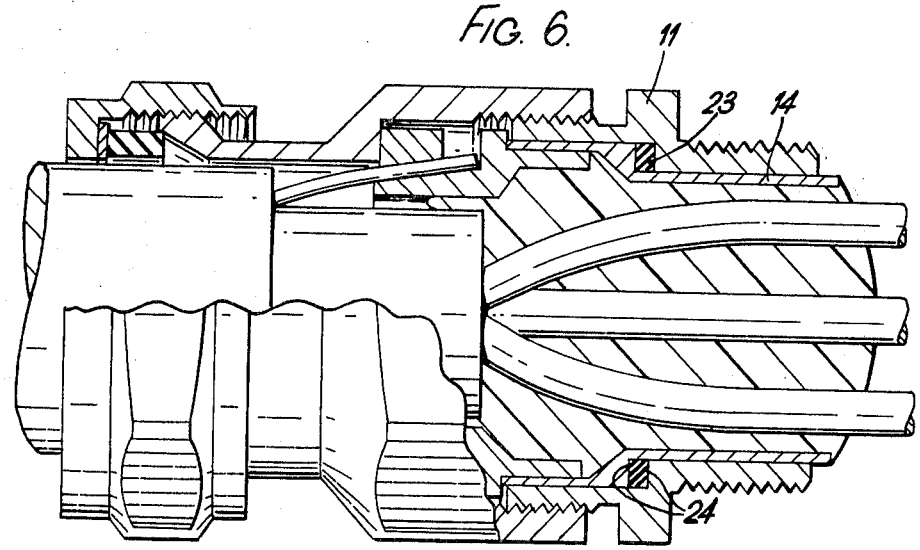
Figure 10:
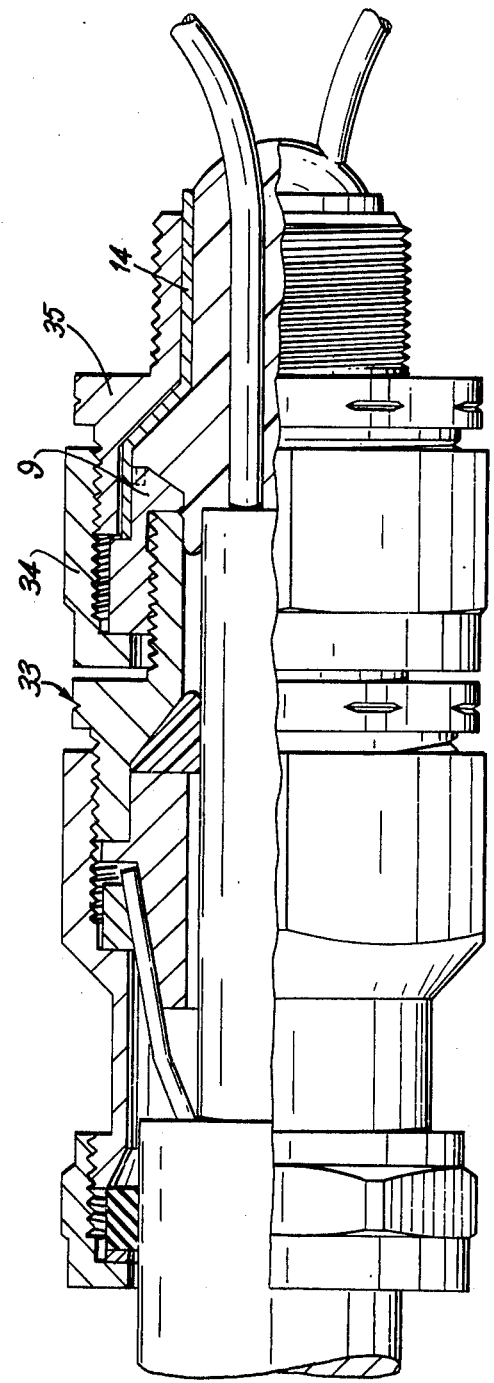

FIGS. 5 and 6 each show another modified form of termination;

FIGS. 7 and 8 are a longitudinal section and end-view respectively of a draw-bolt gland termination in accordance with the invention;

FIG. 9 is longitudinally sectioned view of a mineral-insulated cable termination in accordance with the invention; and FIG. 10 is a longitudinally sectioned view of a termination in accordance with the invention made with a standard gland and an adaptor.

Figure 1:
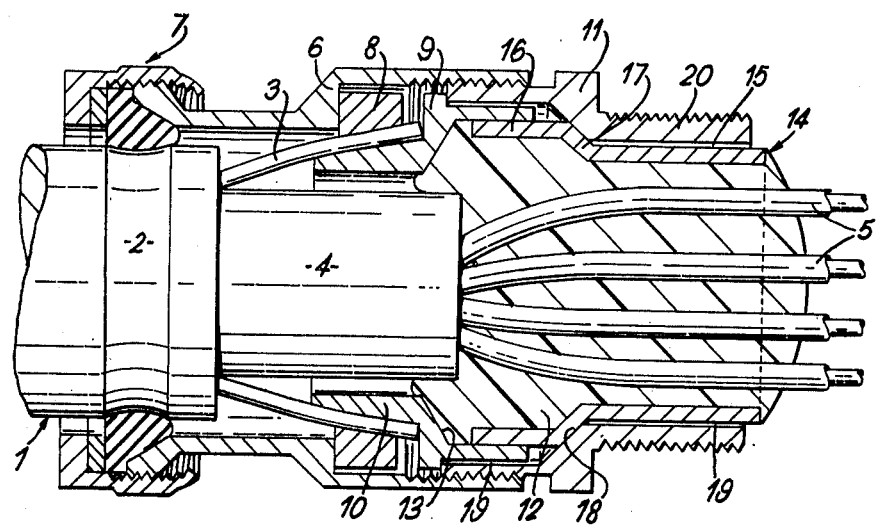
FIG. 1 is a longitudinally sectioned view of one form of cable termination in accordance with the invention.

In making the termination shown in FIG. 1 the end of a cable 1 is cut back in the conventional way to expose, besides the outer sheath 2 appropriate lengths of armour wire 3, bedding (or inner sheath) 4 and insulated conductors 5. A gland barrel or annular terminator member 6 carrying a conventional outer seal assembly 7 is threaded over the prepared cable end, followed by an armour gripping ring 8. The armour wires are now splayed out to the position shown and a first gland member or annular terminator member 9 is inserted with its armour cone 10 beneath the armour wires, which are gripped by temporarily screwing a gland body or annular terminator member 11 into the barrel.

The gland body is now removed, and a suitable quantity of a cold-setting resinous insulating "compound" 12 is pressed by hand or otherwise into a recess 13 with a frustoconical base in the front face of the first gland member 9 so as to completely fill it and stand proud of it to a considerable extent. While the hardening compound is still in a pasty or viscous condition, a second gland member or annular terminator member 14 is passed over the cable conductors 5 and telescoped with the first gland member. This second gland member has parallel end-parts, the front end part 15 being smaller in diameter than the rear end-part 16 and the two end parts being joined by a frustoconical intermediate part 17. When the gland body 11 is again screwed into the gland barrel 6, the intermediate part 17 engages a correspondingly tapered shoulder 18 to urge the first and second gland members together and so generate pressure in the compound, and to centre the parts to form a flame-gap 19 between them.

The termination may be secured by screwing the spigot 20 on the body into a threaded aperture in the usual way. It will be observed that the second gland member 14 and the compound 12 are both visible at the front end of the gland.

Figure 2:
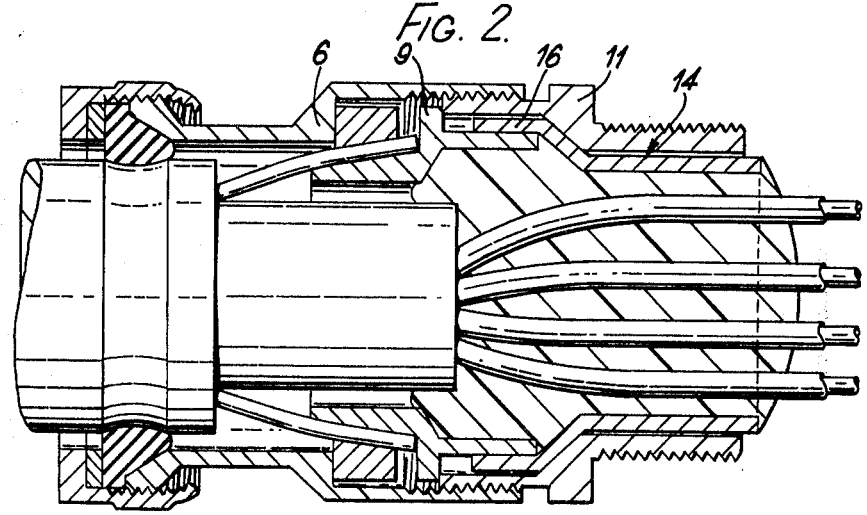
FIG. 2 is a similar view of a modified termination.

The termination of FIG. 2 differs only in having the first gland member 9 enter the rear part 16 of the second gland member 14. This reduces the risk that compound leaking between the first and second gland members will bond them to the body 11.

Figure 3:
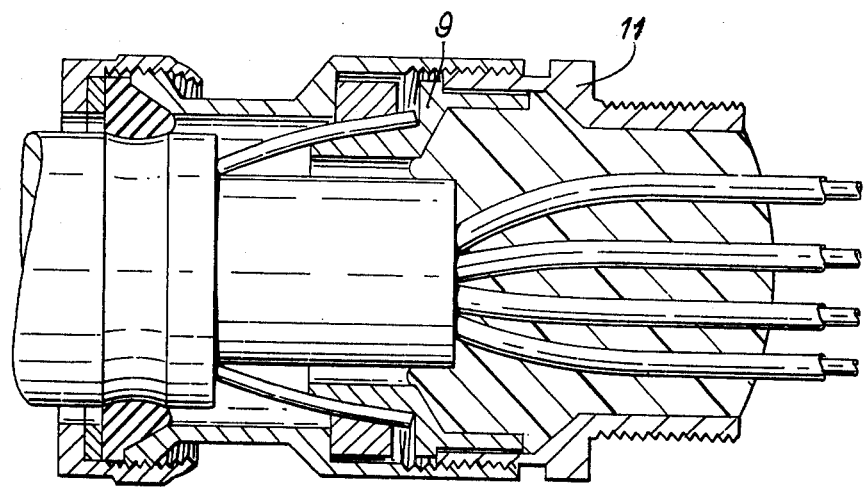
FIG. 3 is a similar view of a more economical but less technically satisfactory termination.

The termination of FIG. 3 is similar to that of FIG. 2 except that the body 11 of the gland itself acts as the second gland member. This arrangement of course prevents rotation of the gland body with respect to the cable, unless the seal is broken, and may be disadvantageous in some installations.

Figure 4:
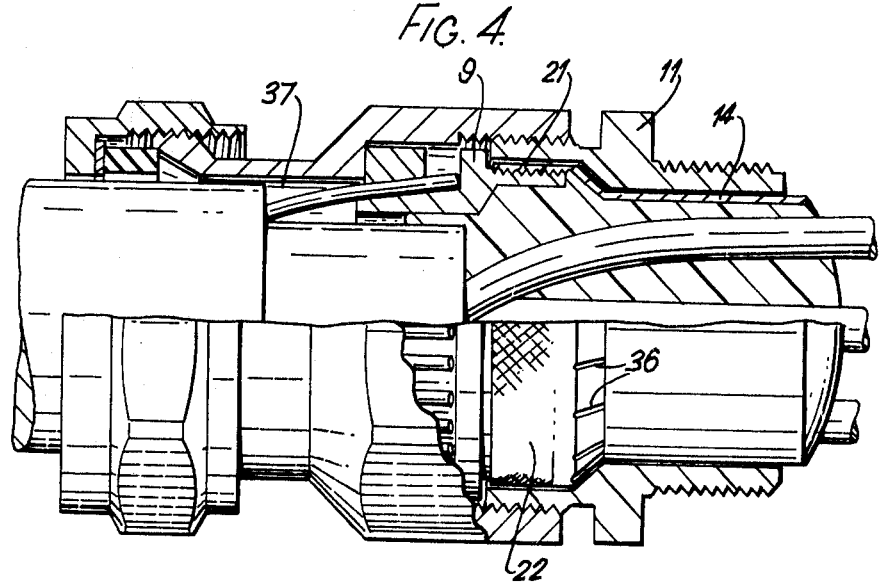
FIG. 4 is a cut-away view of another modified termination in accordance with the invention.

FIG. 4 illustrates another modification, in which the first and second gland members 9 and 14 are themselves screwed together at 21. The outer surface 22 is knurled to facilitate turning or alternatively (not shown) two or more flats may be provided to allow use of a spanner.

The termination of FIG. 5 is similar to that shown in FIG. 2 except that a flameproof sealing ring 23 is inserted between the second gland member 14 and the gland body 11, and that of FIG. 6 is similar except that the ring 23 is housed between square shoulders 24, so that the parts are no longer self-centering. In both these cases the sealing ring is preferably bonded in the factory to the second gland member (or to the body) to avoid accidental loss. Both these designs can be modified by using a ring of a suitable cold setting resinous compound (applied in a pasty or viscous condition) instead of the ring.

FIGS. 7 and 8 show a "continental style" termination which is similar to that shown in FIG. 2 except that there is no outer seal and the gland barrel and body (6 and 11 respectively in FIG. 2) are replaced by two further gland members 25, 26 which are drawn together by bolts 27 instead of directly screwing together.

FIG. 9 shows a termination in accordance with the invention used on a mineral insulated cable having a copper or aluminium sheath 28 with a lead overshath (or jacket) 29. As in the forms previously described, a seal is formed by resinous sealing compound 12 pressurised between first and second gland numbers 9 and 14 respectively and these are drawn together by a gland barrel 6 and a gland body 11. In this case however the fitting is mounted on the cable end by a seal, in accordance with British patent specification No. 1,346,297, comprising an elastomeric ring 30 (for example of polychloroprene) and a lead insert 31. A skid washer 32 co-operates with the first gland member 9 to compress the seal without relative rotation of the gripping surfaces, and the resilience of the elastomeric ring 30 provides stable sealing and contact pressure and ensures a good range-taking capacity.

FIG. 10 shows a form of termination which is similar to FIG. 2 except that the first gland member 9, instead of being directly mounted on the cutback cable end, is secured to it by a standard (nonflameproof) gland 33. For illustration a type EIW gland (British Standard 6121:1973) has been shown, but many other suitable types can be used. Further gland members 34, 35 perform the main functions or gland barrel and body (6 and 11, FIG. 2 ) respectively.

In most cases a fluid-tight seal between the second gland member and the gland body or other further gland member surrounding it is advantageous, but there may be special cases in which it is undesirable. In this case, a continuous flame-gap may be ensured by providing ribs, grooves or other suitable formations on either of these members. For example, FIG. 4 shows grooves 36 in the external frustoconical surface of the second gland member to ensure a continuous pressure equalising passage from the front of the gland to the space 37 in which the armour wires are terminated. Similar provision may be made in other terminations, when appropriate.

What I claim as my invention is:

1. A method of forming a termination at the end of an electric line comprising at least one insulated conductor and a protective layer surrounding said insulated conductor where said line enters an enclosure through an aperture therein distinguished by the following sequence of steps:
    1. Preparing said end of the line with said conductor projecting forwardly from an end of said protective layer;
    2. Securing said end of the line in a first annular terminator member having a recess in its forwardly-directed face around a passage therethrough, said line extending through said passage and said end of the protective layer being within said recess;
    3. Applying a quantity of a hardenable compound, in a pasty or viscous condition, to fill and stand proud of said recess and to adhere to said line within said recess;
    4. Assembling a second annular terminator member, having a recess in its rearwardly-directed face, with said first terminator member to enclose said compound to an extent sufficient to allow generation of pressure in said compound;
    5. Drawing said first terminator member and said second terminator member together by means of a pair of further annular terminator members before said compound has hardened to press said compound into firm contact with said line, and
    6. Securing a said further annular terminator member by mechanically engaging same in said aperture in the enclosure.

2. A method as claimed in claim 1 wherein said line is a cable having armour wires outside said protective layer comprising securing its said end by securing said armour wires to said first annular terminator member.

3. A method in accordance with claim 1 wherein said recess in the first annular terminator member has a frustoconical base.

4. A method as claimed in claim 1 wherein said second annular terminator member comprises two parallel portions joined by a frustoconical tapered portion.

5. A method as claimed in claim 1 wherein said recess in the first annular terminator member has a frustoconical base and said second annular terminator member comprises two parallel portions joined by a frustoconical tapered portion.

6. A method in accordance with claim 1 in which said line is secured to said first annular terminator member by means of a terminator that is not flameproof.

7. A method as claimed in claim 1 wherein said second annular terminator member projects forwardly beyond every terminator member apart from itself and said compound completely fills said second annular terminator member and protrudes from the front end thereof, so that said second annular terminator member and said compound are both visible at the front of the termination.

8. A method as claimed in claim 1 comprising forming a fluid-tight seal between said second annular terminator member and a said further annular terminator member surrounding it.

9. A method as claimed in claim 1 comprising forming a continous flame gap between said second annular terminator member and a said further annular terminator member surrounding it.

10. A terminator for an electric line comprising a first annular terminator member with a passage for said line; securing means for securing said line to said first annular terminator member; a second annular terminator member telescopically engageable at its rear end with the front end of said first annular terminator member, and means including a pair of further annular terminator members for drawing said first and second annular terminator members towards one another, said first annular terminator member having a recess in its front face surrounding said passage and said second annular terminator member having a recess in its rear face to form with said recess in said first annular terminator member a compound chamber.

11. A terminator in accordance with claim 10, for a cable with armour wires, wherein said securing means comprises an armour wire grip.

12. A terminator in accordance with claim 10 in which said recess in said first annular terminator member has a frustoconical base.

13. A terminator in accordance with claim 10 wherein said second annular terminator member comprises two parallel portions joined by a frustoconical tapered portion.

14. A terminator in accordance with claim 10 wherein said recess in said first annular terminator member has a frustoconical base and said second annular terminator member comprises two parallel portions joined by a frustoconical tapered portion.

15. A flameproof terminator in accordance with claim 22 wherein said securing means consists of a terminator that is not flameproof.

16. A terminator in accordance with claim 10 wherein said second annular terminator member projects forwardly beyond every terminator member apart from itself.

17. A terminator in accordance with claim 10 comprising a fluid-tight seal between said second annular terminator member and a said further annular terminator member surrounding it.

18. A terminator in accordance with claim 10 comprising a continuous flame-gap between said second annular terminator member and a said further annular terminator member surrounding it.

* * * * *